(12) United States Patent
Kim (10) Patent No.: US 11,572,060 B2
(45) Date of Patent: Feb. 7, 2023

(54) METHOD FOR SENSING FAILURE OF HYBRID VEHICLE

(71) Applicants: Hyundai Motor Company, Seoul (KR); Kia Motors Corporation, Seoul (KR)

(72) Inventor: Jin-Sung Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 108 days.

(21) Appl. No.: 17/159,879

(22) Filed: Jan. 27, 2021

(65) Prior Publication Data

US 2022/0055612 A1 Feb. 24, 2022

(30) Foreign Application Priority Data

Aug. 21, 2020 (KR) .......................... 10-2020-0105436

(51) Int. Cl.
*B60W 20/50* (2016.01)
*B60W 50/029* (2012.01)
(Continued)

(52) U.S. Cl.
CPC ............ *B60W 20/50* (2013.01); *B60W 20/14* (2016.01); *B60W 20/15* (2016.01); *B60W 20/40* (2013.01);
(Continued)

(58) Field of Classification Search
CPC ...... B60W 20/50; B60W 20/14; B60W 20/15; B60W 20/40; B60W 50/029;
(Continued)

(56) References Cited

U.S. PATENT DOCUMENTS 7,084,589 B1 * 8/2006 Supina ................... B60L 58/40
180/65.8
9,499,040 B2 11/2016 Roos et al.
(Continued)

FOREIGN PATENT DOCUMENTS

JP 3820643 B2 * 9/2006
KR 10-1683525 B1 12/2016

OTHER PUBLICATIONS

JP-3820643-B2 translation (Year: 2006).*

*Primary Examiner* — Jeff A Burke
*Assistant Examiner* — Kyle T Johnson
(74) *Attorney, Agent, or Firm* — Morgan, Lewis & Bockius LLP (57) ABSTRACT

A method may include distributing target torque to target engine torque of an engine and target motor torque of a motor according to a predetermined control logic according to driver demand torque, comparing torques which determines whether actual torques of the engine and the motor are smaller than the target engine torque and the target motor torque, comparing whether a time period during which a state where a state where the torque of the engine or the motor is insufficient is maintained is a predetermined reference time or more, determining that any one of the engine and the motor is failed, when the time during which a state where the state where the torque of the engine or the motor is insufficient is maintained is the reference time or more, and controlling limp-home which limits the target engine torque of the engine, the target motor torque of the motor, and the regenerative braking amount of the motor.

17 Claims, 4 Drawing Sheets

(51) Int. Cl.
  *B60W 20/40* (2016.01)
  *B60W 20/14* (2016.01)
  *B60W 20/15* (2016.01)
(52) U.S. Cl.
  CPC ... *B60W 50/029* (2013.01); *B60W 2050/0292* (2013.01)
(58) Field of Classification Search
  CPC ......... B60W 2050/0292; B60W 20/11; B60W 30/18127; B60W 50/038; B60W 2050/022; B60W 2510/0657; B60W 2510/083; B60W 2710/0666; B60W 10/06; B60W 10/08; B60W 20/10; B60W 2510/244; B60W 2710/083; B60W 20/13; B60W 50/10; B60W 50/14; B60W 2050/143; B60L 58/14; B60L 2240/547; B60Y 2200/92; B60Y 2300/18125; B60Y 2302/03; B60Y 2306/15; Y02T 10/70
  See application file for complete search history.

(56) References Cited

U.S. PATENT DOCUMENTS

| | | | |
|---|---|---|---|
| 9,821,791 B2* | 11/2017 | Dextreit | B60W 50/0097 |
| 9,856,815 B2 | 1/2018 | Park et al. | |
| 10,363,926 B2* | 7/2019 | Habu | F02D 41/22 |
| 2003/0178970 A1* | 9/2003 | Minamiura | H02J 7/14 320/116 |
| 2009/0188733 A1* | 7/2009 | Mack | B60W 20/13 180/65.285 |
| 2010/0263953 A1* | 10/2010 | Shimana | H02P 29/032 180/65.285 |
| 2011/0276213 A1* | 11/2011 | Tomatsuri | B60K 6/365 180/65.265 |
| 2012/0109435 A1* | 5/2012 | Mikulec | B60L 3/04 180/65.265 |
| 2012/0197473 A1* | 8/2012 | Kshatriya | B60K 6/485 903/903 |
| 2013/0332016 A1* | 12/2013 | Suzuki | B60W 10/30 701/22 |
| 2015/0001916 A1* | 1/2015 | Murayama | B60T 13/586 303/3 |
| 2015/0097501 A1* | 4/2015 | Yamane | B60L 1/00 318/400.3 |
| 2017/0058812 A1 | 3/2017 | Park et al. | |
| 2018/0108254 A1* | 4/2018 | Camacho | G05D 1/0287 |
| 2018/0208175 A1* | 7/2018 | Zhang | B60W 10/26 |
| 2020/0353843 A1* | 11/2020 | Eriksson | B60L 3/0061 |
| 2021/0178908 A1* | 6/2021 | Kim | B60L 3/0038 |

* cited by examiner

FIG.1

METHOD FOR SENSING FAILURE OF HYBRID VEHICLE

CROSS-REFERENCE TO RELATED APPLICATION

The present application claims priority to Korean Patent Application No. 10-2020-0105436, filed on Aug. 21, 2020, the entire contents of which is incorporated herein for all purposes by this reference.

BACKGROUND OF THE PRESENT INVENTION

Field of the Invention

The present invention relates to a method for sensing failure of a hybrid vehicle, which senses failure of a hybrid system for driving a hybrid vehicle, and controls the hybrid system in a limp-home mode upon occurrence of the failure.

Description of Related Art

A hybrid vehicle has both an engine and a motor, and as necessary, drives the hybrid vehicle with any one of the engine and the motor, or drives the hybrid vehicle using both the engine and the motor.

The hybrid vehicle determines a driver demand torque, and distributes a target torque of the engine and a target torque of the motor in consideration of fuel efficiency and power performance.

For example, when the driver demand torque is '100', the hybrid vehicle is driven such that the target engine torque is distributed to '70' and the target motor torque is distributed to '30'.

Meanwhile, if a torque of any one of the engine and the motor is insufficient, the other one compensates for the amount of insufficiency to follow the driver demand torque. That is, since the driver demand torque is '100', it has been planned that the target engine torque is distributed to '70' and the target motor torque is distributed to '30', but if an actual torque of the engine is only '50', the motor compensates for '20', which is the amount of insufficiency of the actual torque of the engine, to control a torque of the motor to be '50'.

However, in a conventional hybrid vehicle, the other one merely compensates for the amount of insufficiency if the torque output from any one of the engine and the motor is small, and there is no function of determining whether there is failure.

Therefore, there is a problem in that a high voltage battery is over-discharged, or over-charged. That is, when the torque of the engine is insufficient, the motor compensates for the torque of the engine and the high voltage battery is over-discharged. To protect the high voltage battery when the high voltage battery is over-discharged, the hybrid system shuts down the entire system. Alternatively, when a torque of the motor is insufficient, the engine is driven to compensate for a torque of the motor and thus the high voltage battery is over-charged, and even at the present time, the hybrid system shuts down the entire system to protect the high voltage battery.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method for sensing failure of a hybrid vehicle, which may sense, as failure of a vehicle, when the torque of an engine or a motor is continuously compensated in a hybrid vehicle, and control a hybrid system in a limp-home mode.

A method for sensing failure of a hybrid vehicle including an engine, a motor, a high voltage battery for supplying power to the motor, and charged by the regenerative braking of the motor, an engine controller configured for controlling an operation of the engine, a motor controller configured for controlling an operation of the motor, and a vehicle controller configured for controlling the engine controller and the motor controller by distributing a target torque of a vehicle determined from a demand torque input by a driver to a target engine torque and a target motor torque according to various exemplary embodiments of the present invention for achieving the object includes: operating, by the vehicle controller, the engine and the motor by distributing the target torque to the target engine torque of the engine and the target motor torque of the motor according to a predetermined control logic according to the demand torque input by the driver; determining, by the vehicle controller, whether an actual engine torque of the engine is smaller than the target engine torque, or an actual motor torque of the motor is smaller than the target motor torque; determining, by the vehicle controller, whether a time period during which a state where the actual engine torque of the engine is smaller than the target engine torque, or the actual motor torque of the motor is smaller than the target motor torque is maintained is equal to or greater than a predetermined reference time period; determining failure which determines, by the vehicle controller, that any one of the engine and the motor is failed, when the time during which a state where the state where the actual engine torque of the engine is smaller than the target engine torque, or the actual motor torque of the motor is smaller than the target motor torque is maintained is the reference time or more; and controlling a limp-home which limits, by the vehicle controller, the target engine torque of the engine, the target motor torque of the motor, and the regenerative braking amount of the motor.

When the actual engine torque of the engine is smaller than the target engine torque, in the controlling of the limp-home, the vehicle controller is configured to limit the target engine torque of the engine to a limit engine torque of the engine, and is configured to limit the target motor torque of the motor to a maximum motor torque upon the limp-home, to prevent the high voltage battery from being over-discharged.

When the actual motor torque of the motor is smaller than the target motor torque, in the controlling of the limp-home, the vehicle controller is configured to limit the regenerative braking amount of the motor to the maximum regenerative braking amount or less upon a predetermined limp-home, to prevent the high voltage battery from being over-charged.

The method may further include after the determining of the failure, alarming failure which operates, by the vehicle controller, a warning unit provided on one side of the vehicle.

In the controlling of the limp-home, the vehicle controller reduces the target engine torque, the target motor torque, and the regenerative braking amount of the motor as a traveling distance of the vehicle increases.

The vehicle controller reduces the maximum motor torque upon the limp-home or a maximum regenerative braking amount upon the limp-home as the traveling distance of the vehicle increases.

A method for sensing failure of a hybrid vehicle including an engine, a motor, a high voltage battery for supplying power to the motor, and charged by the regenerative braking of the motor, an engine controller configured for controlling an operation of the engine, a motor controller configured for controlling an operation of the motor, and a vehicle controller configured for controlling the engine controller and the motor controller by distributing a target torque of a vehicle determined from a demand torque input by a driver to a target engine torque and a target motor torque according to various exemplary embodiments of the present invention includes: determining a state of charge (SOC) modeling which determines, by the vehicle controller, an SOC value of the high voltage battery according to the operation and the regenerative braking of the motor by a predetermined model; comparing, by the vehicle controller, whether a difference between the determined SOC value of the high voltage battery and an actual SOC value of the high voltage battery is greater than a predetermined reference value; determining, by the vehicle controller, whether a time period during which a state where the difference between the determined SOC and the actual SOC is greater than the predetermined reference value is maintained is equal to or greater than a predetermined reference time period; determining failure which determines, by the vehicle controller, that any one of the engine and the motor is failed, when the time during which a state where the state where the difference between the determined SOC and the actual SOC is greater than the predetermined reference value is maintained is the reference time or more; and controlling a limp-home in which a use amount or a regenerative braking amount of the motor is limited by the vehicle controller.

When the actual SOC is smaller than the determined SOC, in the controlling of the limp-home, the vehicle controller is configured to limit a torque of the motor to a value being equal to or smaller than a maximum motor torque upon a predetermined limp-home.

When the actual SOC is greater than the determined SOC, in the controlling of the limp-home, the vehicle controller is configured to limit the regenerative braking amount of the motor to the maximum regenerative braking amount or less upon a predetermined limp-home.

The method may further include after the determining of the failure, alarming failure which operates, by the vehicle controller, a warning unit provided on one side of the vehicle.

In the comparing of the SOCs, the vehicle controller compares whether an absolute value of the difference between the determined SOC value of the high voltage battery and the actual SOC value of the high voltage battery is greater than the reference value.

In the controlling of the limp-home, the vehicle controller reduces the maximum motor torque upon the limp-home or a maximum regenerative braking amount upon the limp-home as a traveling distance of the vehicle increases.

Meanwhile, a method for sensing failure of a hybrid vehicle including an engine, a motor, a high voltage battery for supplying power to the motor, and charged by the regenerative braking of the motor, an engine controller configured for controlling an operation of the engine, a motor controller configured for controlling an operation of the motor, and a vehicle controller configured for controlling the engine controller and the motor controller by distributing a target torque of a vehicle determined from a demand torque input by a driver to a target engine torque and a target motor torque according to various exemplary embodiments of the present invention includes: operating, by the vehicle controller, the engine and the motor by distributing the target torque to the target engine torque of the engine and the target motor torque of the motor according to a predetermined control logic according to the demand torque input by the driver; determining an SOC modeling which determines, by the vehicle controller, an SOC value of the high voltage battery as the motor operates with the target motor torque by a predetermined model; comparing, by the vehicle controller, whether a difference between the determined SOC value of the high voltage battery and an actual SOC value of the high voltage battery is greater than a predetermined reference value; determining, by the vehicle controller, whether a time period during which a state where the difference between the determined SOC and the actual SOC is maintained is greater than the reference time; determining failure which determines, by the vehicle controller, that any one of the engine and the motor is failed, when the time during which a state where the state where the difference between the determined SOC and the actual SOC is maintained is greater than the reference time; and controlling a limp-home in which a use amount or a regenerative braking amount of the motor is limited by the vehicle controller.

When the actual SOC is smaller than the determined SOC, in the controlling of the limp-home, the vehicle controller is configured to limit a torque of the motor to a value being equal to or smaller than a maximum motor torque upon a predetermined limp-home.

When the actual SOC is greater than the determined SOC, in the controlling of the limp-home, the vehicle controller is configured to limit the regenerative braking amount of the motor to the maximum regenerative braking amount or less upon a predetermined limp-home.

The method may further include after the determining of the failure, alarming failure which operates, by the vehicle controller, a warning unit provided on one side of the vehicle.

In the comparing of the SOCs, the vehicle controller compares whether an absolute value of the difference between the determined SOC value of the high voltage battery and the actual SOC value of the high voltage battery is greater than the reference value.

In the controlling of the limp-home, the vehicle controller reduces the maximum motor torque upon the limp-home or a maximum regenerative braking amount upon the limp-home as a traveling distance of the vehicle increases.

The method for sensing the failure of the hybrid vehicle according to various exemplary embodiments of the present invention having the above configuration may control the hybrid system in the limp-home mode, if the torque of any one of the engine or the motor is insufficient and thus the time for compensating for the amount of insufficiency is continuous, preventing the over-discharge and over-charge of the high voltage battery.

Furthermore, it is possible to allow the driver to recognize the failure of the hybrid vehicle in advance, inducing the visit of the auto repair shop.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a system and a method for sensing failure of a hybrid vehicle according to various exemplary embodiments of the present invention will be described in detail with reference to the accompanying drawings.

Figure 1:
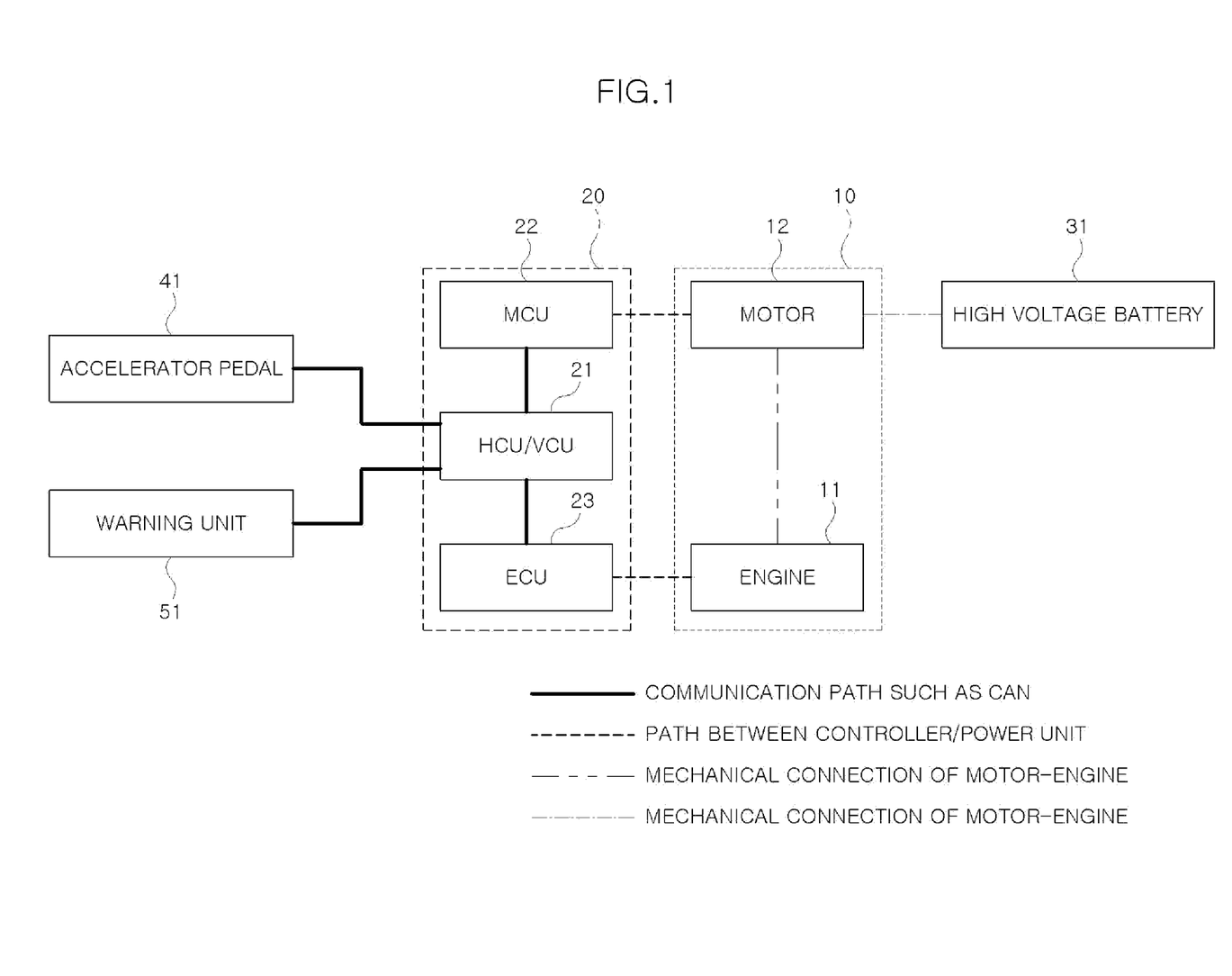
FIG. 1 is a block diagram illustrating a system in which a method for sensing failure of a hybrid vehicle according to various exemplary embodiments of the present invention is performed.

A system for sensing failure of a hybrid vehicle according to various exemplary embodiments of the present invention includes an engine 11, a motor 12, a high voltage battery 31 for supplying power to the motor 12, and charged by the regenerative braking of the motor 12, an engine controller 21 for controlling an operation of the engine 11, a motor controller 22 for controlling an operation of the motor 12, and a vehicle controller 23 for controlling the engine controller 21 and the motor controller 22 by distributing a target torque of a vehicle determined from a demand torque input by a driver to a target engine torque of the engine and a target motor torque of the motor, in which the vehicle controller 23 determines that at least any one of the engine 11 and the motor 12 is failed, when a difference between a determined SOC value of the high voltage battery 31 and an actual SOC is maintained during a reference time or more in a state of being greater than a reference value, an actual engine torque of the engine 11 is maintained during a reference time or more in a state of being lower than the target engine torque, or an actual motor torque of the motor 12 is maintained during a reference time or more in a state of being lower than the target motor torque by failure of any one of the engine 11 and the motor 12.

The hybrid vehicle has both the engine 11 and the motor 12 to generate power, and the vehicle is driven using any one of the engine 11 and the motor 12 or both the engine 11 and the motor 12. The motor 12 is driven by the power of the high voltage battery 31, and is configured to charge the high voltage battery 31 upon regenerative braking.

A power unit 10 including the engine 11 and the motor 12 is controlled by the controller 20 for controlling an operation of the power unit 10.

The controller 20 includes an engine controller 21 for controlling an operation of the engine 11, the motor controller 22 for controlling an operation of the motor 12, and the vehicle controller 23 for controlling the driving of the hybrid vehicle by controlling the engine controller 21 and the motor controller 22.

The vehicle controller 23 may be a hybrid control unit (HCU)/a vehicle control unit (VCU). The vehicle controller 23 controls the entire system of the hybrid vehicle. Furthermore, when a driver demand torque is input by operation of an accelerator pedal 41 or the like, the vehicle controller 23 determines a target torque of a vehicle for following the demand torque, and distributes the target torque to the engine 11 and the motor 12 such that the vehicle controller 23 distributes the target torque to the target engine torque and the target motor torque to be output from each of the engine 11 and the motor 12 to be transmitted to each of the engine controller 21 and the motor controller 22.

The engine controller 21 controls the engine 11 such that the target engine torque transmitted from the vehicle controller 23 is exerted, and receives the actual engine torque actually output from the engine 11 to transmit the actual engine torque to the vehicle controller 23.

Furthermore, the engine controller 21 may also compare the target engine torque with the actual engine torque to transmit a difference therebetween to the vehicle controller 23.

Furthermore, when the instruction from the vehicle controller 23 is transmitted to operate the engine 11 at the target engine torque of the engine 11 equal to or smaller than a limit engine torque upon failure determination, the vehicle controller 23 controls the engine 11 according to the above.

The motor controller 22 also controls the motor 12 such that the target motor torque transmitted from the vehicle controller 23 is exerted, and receives the actual motor torque actually output from the motor 12 to transmit the actual motor torque to the vehicle controller 23. Furthermore, the motor controller 22 controls the regenerative braking amount of the motor 12. The motor exerts a driving force by the power of the high voltage battery 31 to drive the vehicle, but also charges the high voltage battery 31 by the regenerative braking. The motor controller 22 controls the regenerative braking of the motor 12 as well as the driving of the motor 12.

The motor controller 22 may also compare the target motor torque with the actual motor torque to transmit a difference therebetween to the vehicle controller 23.

Furthermore, the motor controller 22 controls the target motor torque of the motor 12 such that the motor 12 is driven at the maximum motor torque upon limp-home upon failure determination, or limits the regenerative braking of the motor 12 with the maximum regenerative braking amount upon limp-home.

The vehicle controller 23 determines whether the actual torques of the engine 11 and the motor 12, that is, the actual engine torque and the actual motor torque match with the target engine torque and the target motor torque. If the actual engine torque is lower than the target engine torque, the motor 12 compensates for the insufficient torque of the engine 11, and if the actual motor torque is lower than the target motor torque, the engine 11 compensates for a torque of the motor 12.

When the insufficiency of the torque of the engine 11 and the insufficiency of a torque of the motor 12 are temporary, the side not insufficient just compensates for the insufficient torque as described above.

However, when the phenomenon in which the torque is insufficient is continuous, this means that there is abnormality in a system related to the driving of the engine 11 or a system related to the driving of the motor 12. Furthermore, therefore, there is a concern that the high voltage battery 31 for supplying power to the motor 12 is excessively consumed or over-charged, and thus the related system is shut down to protect the high voltage battery 31.

The present invention senses, as failure, the case where not only the simple torque is compensated, but also such a phenomenon is continuous, and in various aspects of the present invention, the hybrid vehicle is controlled in a limp-home mode.

The vehicle controller 23 has the method for sensing the failure of the hybrid vehicle to be described later stored as a logic, thereby performing the method for sensing the failure of a hybrid vehicle.

Figure 2:
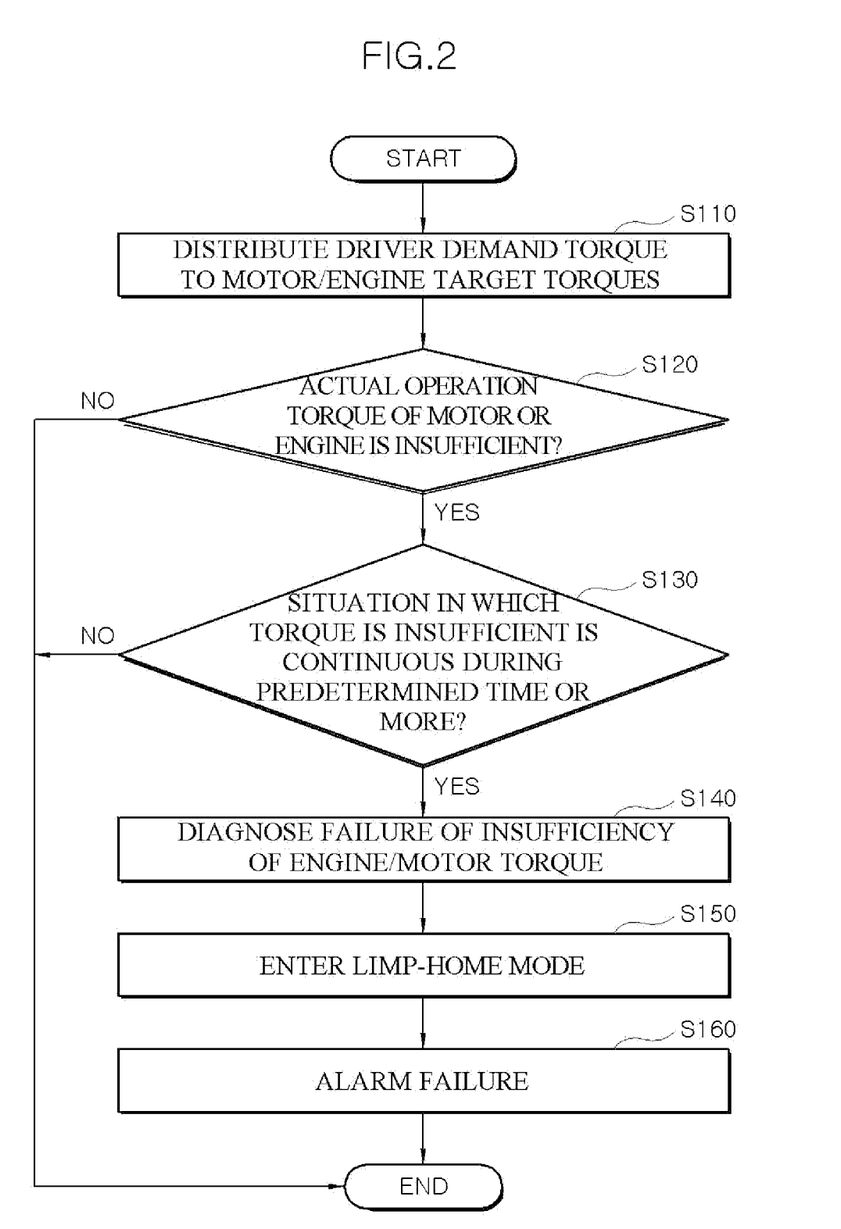
FIG. 2 is a flowchart illustrating the method for sensing the failure of a hybrid vehicle according to various exemplary embodiments of the present invention.

FIG. 2 illustrates the method for sensing the failure of a hybrid vehicle according to various exemplary embodiments of the present invention.

The method for sensing the failure of the hybrid vehicle according to the exemplary embodiment of the present invention is performed by a system for sensing the failure of the hybrid vehicle described above.

In distributing a target torque (S110), the vehicle controller 23 controls a vehicle to distribute a target torque to a target engine torque of the engine 11 and a target motor torque of the motor 12 by a predetermined model according to a driver demand torque, and drives each of the engine 11 and the motor 12 with the distributed target engine torque and target motor torque. A driver transmits a traveling speed desired by the driver, the acceleration will of the driver, or the like to the vehicle through the accelerator pedal 41 or the like, and the vehicle controller 23 controls the vehicle to exert the demand torque matched with the driver's intent. The target torques of the engine 11 and the motor 12 are stored inside the vehicle controller 23 as a predetermined control logic according to the demand torque of the driver and the state of the vehicle. According to the control logic, the vehicle controller 23 distributes the target torques of the engine 11 and the motor 12, and transmits the target torques to each of the engine controller 21 and the motor controller 22. The engine controller 21 and the motor controller 22 drive the engine 11 and the motor 12 with the target engine torque and the target motor torque, respectively.

In comparing torques (S120), the vehicle controller 23 determines whether the actual engine torque of the engine 11 is smaller than the target engine torque, or the actual motor torque of the motor 12 is smaller than the target motor torque.

The engine controller 21 measure the actual engine torque of the engine 11 to transmit the actual engine torque to the vehicle controller 23, and the motor controller 22 also measures the actual motor torque of the motor 12 to transmit the actual motor torque to the vehicle controller 23. When receiving the actual engine torque and the actual motor torque, the vehicle controller 23 determines whether the actual engine torque is smaller than the target engine torque or the actual motor torque is smaller than the target motor torque.

Meanwhile, the engine controller 21 may also determine whether the actual engine torque is smaller than the target engine torque to transmit the result and the actual engine torque to the vehicle controller 23. Furthermore, the motor controller 22 may also determine whether the actual motor torque is smaller than the target motor torque to transmit the result and the actual motor torque to the vehicle controller 23.

In comparing times (S130), the vehicle controller 23 determines whether a time period during which a state where a state where the actual engine torque of the engine 11 is smaller than the target engine torque, or the actual motor torque of the motor 12 is smaller than the target motor torque is maintained is a predetermined reference time or more.

In the comparing of the times (S130), the reason why it determines whether the insufficiency of the torque of the engine 11 or the insufficiency of a torque of the motor 12 is maintained during the reference time or more is to distinguish whether the insufficiency of the torque of the engine 11 or the insufficiency of a torque of the motor 12 is caused by the temporary error, or caused by the failure because the insufficiency of the torque of the engine 11 or the insufficiency of a torque of the motor 12 may occur by a temporary error.

In determining failure (S140), the vehicle controller 23 determines that the engine 11 and the motor 12 are failed, when a time period during which a state where a state where the actual engine torque of the engine 11 is smaller than the target engine torque, or the actual motor torque of the motor 12 is smaller than the target motor torque is maintained is the reference time or more.

When a situation in which a torque is insufficient by the failure of the engine 11 or the motor 12 is continuous, abnormality is caused in the engine 11, the motor 12, or a system related to them such that the vehicle controller 23 determines that the engine 11, the motor 12, or the system related thereto is failed.

In controlling a limp-home (S150), the vehicle controller 23 limits the target engine torque of the engine 11, the target motor torque of the motor 12, and the regenerative braking amount of the motor 12.

In the controlling of the limp-home (S150), the vehicle controller 23 may confirm the maximum torque which may be exerted by each of the engine 11 and the motor 12, and operate the engine 11 and the motor 12 at the maximum torque or less.

For example, when the actual engine torque of the engine 11 is smaller than the target engine torque, the vehicle controller 23 limits the target engine torque of the engine 11 to the actual engine torque of the engine 11, and limits the target motor torque of the motor 12 to the maximum motor torque upon the limp-home to prevent the high voltage battery 31 from being over-discharged. If the insufficiency of the torque of the engine 11 occurs by the failure of the engine 11, the amount of the operation of the motor 12 increases and thus over-discharging may occur to compensate for the amount of insufficiency, and in the case of a situation in which the torque of the engine 11 is insufficient by the failure of the engine 11, the target motor torque of the motor 12 is limited to the maximum motor torque upon the limp-home such that the motor 12 compensates for only a portion of the amount of insufficiency of the torque of the engine 11. Furthermore, since the engine 11 is also in a failed state, the target engine torque of the engine 11 is limited to a limit engine torque set lower than a general engine torque such that the failure does not proceed any more. As described above, in the controlling of the limp-home (S150), the operation of the motor 12 is limited to the maximum motor torque or less upon the limp-home, preventing a phenomenon in which the high voltage battery 31 is over-discharged. The over-discharging of the high voltage battery 31 is prevented such that the shut-down caused by the over-discharging of the high voltage battery 31 is prevented.

Alternatively, when the actual motor torque of the motor 12 is smaller than the target motor torque, the vehicle controller 23 limits the regenerative braking amount of the motor 12 to the maximum regenerative braking amount or less upon a predetermined limp-home to prevent the high voltage battery 31 from being over-charged. If the insufficiency of a torque of the motor 12 is caused by the failure of the motor 12, there occurs a situation in which the amount of operation of the motor 12 is smaller than the modeling and thus the power of the high voltage battery 31 is not consumed, and the high voltage battery 31 is continuously charged by the regenerative braking to be over-charged. Therefore, in the controlling of the limp-home (S150), it is possible to limit the regenerative braking amount of the motor 12 to the maximum regenerative braking amount or less upon the limp-home, preventing a phenomenon in which the high voltage battery 31 is over-charged. The over-charging of the high voltage battery may be prevented, preventing the shut-down caused by the over-charging of the high voltage battery 31.

Meanwhile, in the controlling of the limp-home (S150), the vehicle controller 23 preferably controls the target engine torque to be smaller by reducing the limit engine torque as a traveling distance increases, and also controls the target motor torque and the regenerative braking amount of the motor 12 to be smaller by reducing the maximum motor torque upon the limp-home and the maximum regenerative braking amount upon the limp-home. This is to induce the service by limiting the output of the vehicle, if the vehicle is not serviced by a driver.

In alarming failure (S160), as in the aforementioned exemplary embodiment of the present invention, the vehicle controller 23 operates a warning unit 51 provided on one side of the vehicle, for example, a waning lamp or a speaker. As a result, the driver may easily recognize failure, inducing the vehicle to be serviced.

Figure 3:
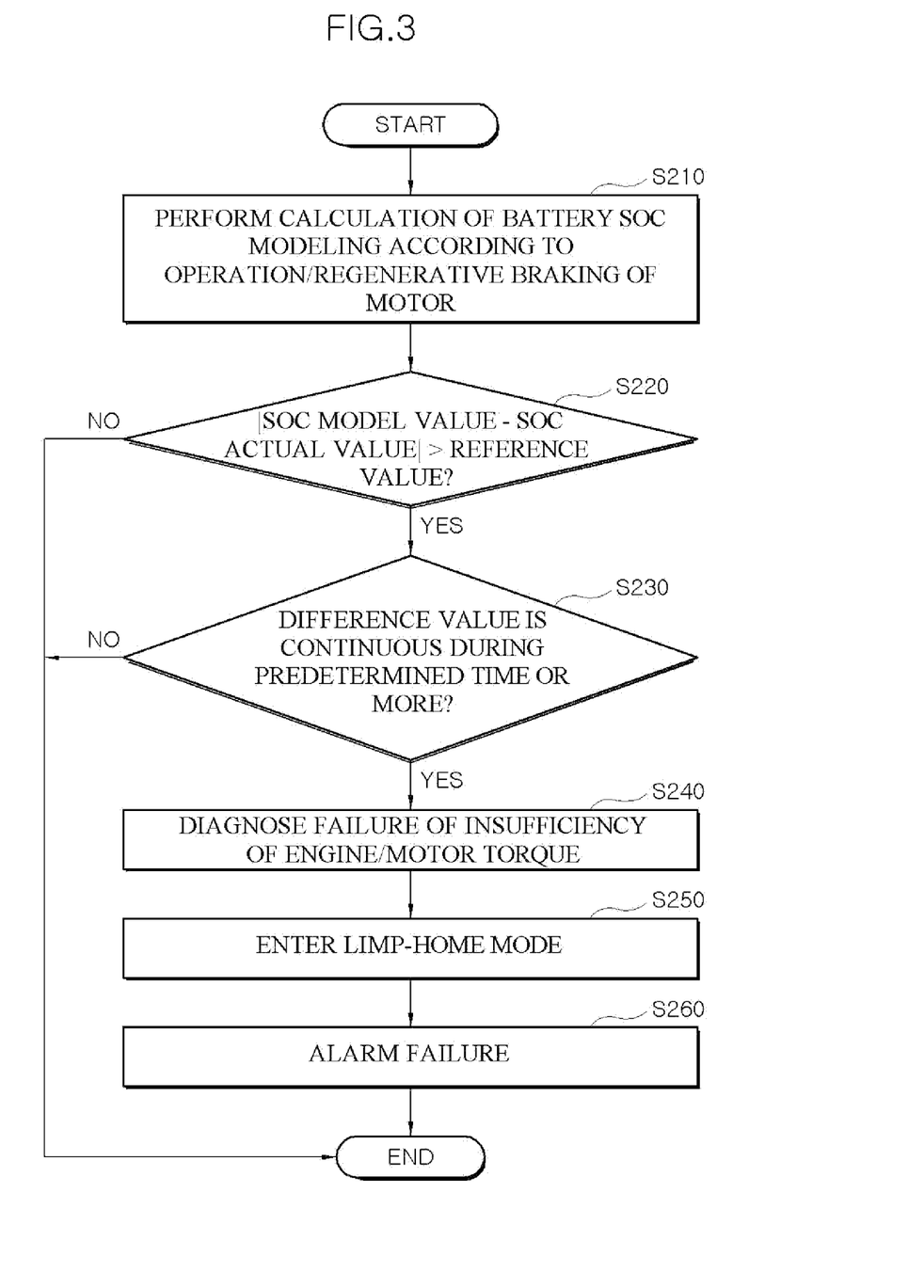
FIG. 3 is a flowchart illustrating a method for sensing failure of a hybrid vehicle according to various exemplary embodiments of the present invention.

Meanwhile, a method for sensing failure of a hybrid vehicle according to various exemplary embodiments of the present invention is illustrated in FIG. 3.

The method for sensing the failure of the hybrid vehicle according to various exemplary embodiments of the present invention is also performed by the aforementioned system for sensing the failure of the hybrid vehicle.

In determining an SOC modeling (S210), the vehicle controller 23 determines an SOC value of the high voltage battery according to the operation and regenerative braking of the motor 12 by a predetermined model. When the traveling speed desired by the driver, the acceleration will of the driver, or the like is transmitted to the interior of the vehicle controller 23 by the operation of the accelerator pedal 41 or the like, the vehicle controller 23 controls the vehicle to exert the demand torque matching with the driver's intent. The target torques of the engine 11 and the motor 12, the change in a state of charge (SOC) value of the high voltage battery 31 according to the operation of the motor 12, and the like are stored inside the vehicle controller 23 in the modeled state according to the demand torque of the driver and the state of the vehicle. When the vehicle is normal, power is generated in each of the engine 11 and the motor 12 according to a pre-stored modeling to exert the demand torque of the driver, and the SOC value of the high voltage battery 31 is changed according to the operation of the motor 12. If there is abnormality in the engine 11 or the motor 12, failure is determined using a difference between the actual SOC value of the high voltage battery 31 and the SOC determined using the modeling.

In comparing SOCs (S220), the vehicle controller 23 compares the difference between the determined SOC and the actual SOC with a predetermined reference value. The vehicle controller 23 compares an absolute value of the difference between the determined SOC value of the high voltage battery 31 and the actual SOC value of the high voltage battery with the predetermined reference value to determine failure. In the comparing of the SOCs (S220), the reason of comparing the difference between the determined SOC and the actual SOC with the absolute value is to determine whether failure occurs with the size of the difference. Furthermore, a specific control method is differently applied according to the difference value in controlling a limp-home (S250) to be described later.

In comparing times (S230), the vehicle controller 23 compares whether a time period during which a state where the difference between the determined SOC and the actual SOC is greater than the predetermined reference value is maintained is a predetermined reference time or more.

In the comparing of the times (S230), the reason of determining whether the difference between the determined SOC and the actual SOC is maintained during the reference time or more is to distinguish whether the difference between the determined SOC and the actual SOC is caused by a temporary error, or caused by failure because the difference between the determined SOC and the actual SOC may be large by the temporary error.

Determining failure (S240) determines that any one of the engine 11 and the motor 12 is failed, when the time during which a state where the difference between the determined SOC and the actual SOC is maintained is the reference time or more.

The state where the difference between the determined SOC and the actual SOC is greater than the predetermined reference value is maintained because there is abnormality in any one of the engine 11 and the motor 12 or the system related to them. Therefore, upon insufficiency of the torque of the engine 11, the motor 12 is operated more than the modeling to be over-discharged (determined SOC>actual SOC), and upon insufficiency of a torque of the motor 12, the motor 12 is operated less than the modeling to be over-charged (determined SOC<actual SOC), and when such a situation is maintained during the reference time or more, the vehicle controller 23 determines that the engine 11, the motor 12, or the system related thereto is failed.

In controlling a limp-home (S250), the vehicle controller 23 limits the use amount or regenerative braking amount of the motor 12 to prevent the shut-down caused by the over-discharging or over-charging of the high voltage battery 31.

In the controlling of the limp-home (S250), the vehicle controller 23 may confirm the maximum torque which may be exerted by each of the engine 11 and the motor 12, and operate the engine 11 and the motor 12 at the maximum torque or less.

For example, in the comparing of the SOCs (S220), when the actual SOC is smaller than the determined SOC, in the controlling of the limp-home (S250), the vehicle controller 23 limits a torque of the motor 12 to the maximum motor torque or less upon a predetermined limp-home. The fact that the actual SOC is smaller than the determined SOC represents a situation in which the amount of operation of the motor 12 is large to compensate for the torque of the engine 11, and the high voltage battery 31 is over-discharged to operate the motor 12. Therefore, the controlling of the limp-home (S250) limits the operation of the motor 12 to the maximum motor torque or less upon the limp-home, preventing the phenomenon in which the high voltage battery 31 is over-discharged. The over-discharging of the high voltage battery 31 is prevented, preventing the shut-down caused by the over-discharging of the high voltage battery 31.

Alternatively, in the comparing the SOCs (S220), when the actual SOC is greater than the determined SOC, in the controlling of the limp-home (S250), the vehicle controller 23 limits the regenerative braking amount of the motor 12 to the maximum regenerative braking amount or less upon a predetermined limp-home. The fact that the actual SOC is greater than the determined SOC represents a situation in which the amount of operation of the engine 11 is large to compensate for a torque of the motor 12, the amount of operation of the motor 12 is small as much as that amount and thus the power of the high voltage battery 31 is not consumed as in the modeling, and the high voltage battery 31 is continuously charged by the regenerative braking to be over-charged. Therefore, the controlling of the limp-home (S250) limits the regenerative braking amount of the motor 12 to the maximum regenerative braking amount or less upon the limp-home, preventing the phenomenon in which the high voltage battery 31 is over-charged. The over-charging of the high voltage battery is prevented, preventing the shut-down caused by the over-charging of the high voltage battery 31.

Meanwhile, in the controlling of the limp-home (S250), the vehicle controller 23 controls the maximum motor torque upon the limp-home or a maximum regenerative braking amount upon the limp-home to be reduced as the traveling distance of the vehicle increases. This is to induce the service by limiting the output of the vehicle, if the vehicle is not serviced by a driver.

The alarming of the failure (S260) operates, by the vehicle controller 23, the warning unit 51 provided on one side of the vehicle. When determining as the failure in the determining of the failure (S240), the vehicle controller 23 operates the warning unit 51 such that the driver may easily recognize the determination result. The vehicle controller 23 operates the warning unit 51, that is, the warning lamp or the speaker such that the driver may easily recognize the failure. The driver may easily recognize the failure, inducing the vehicle to be serviced.

Figure 4:
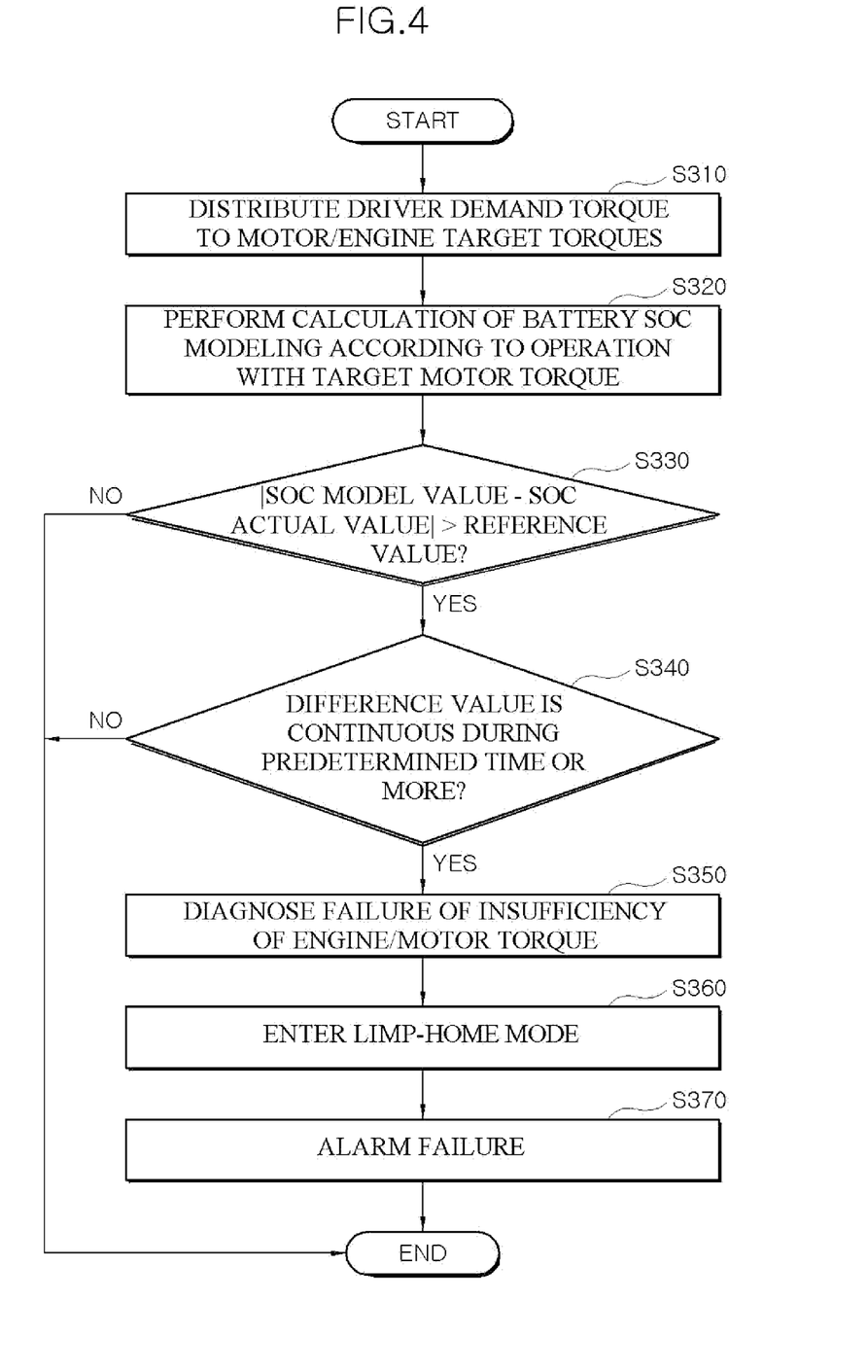
FIG. 4 is a flowchart illustrating a method for sensing failure of a hybrid vehicle according to various exemplary embodiments of the present invention.

FIG. 4 illustrates a method for sensing failure of a hybrid vehicle according to various exemplary embodiments of the present invention.

The method for sensing the failure of a hybrid vehicle according to the exemplary embodiment of the present invention is also performed by the system for sensing the failure of the hybrid vehicle.

In the method for sensing failure of a hybrid vehicle according to the exemplary embodiment of the present invention, the vehicle controller 23 controls the engine 11 and the motor 12 according to a predetermined control logic according to the driver demand torque, and models the SOC value of the high voltage battery 31 to detect failure of the engine 11 or the motor 12.

In distributing a target torque (S310), the vehicle controller 23 operates the engine 11 and the motor 12 by distributing the target torque to a target engine torque of the engine 11 and a target motor torque of the motor 12 according to the predetermined control logic according to the driver demand torque.

The driver transmits the desired traveling speed, the acceleration will of the driver, or the like using the accelerator pedal 41 or the like, and the vehicle controller 23 controls the vehicle according to the predetermined control logic to exert the demand torque matched with the driver's intent. The vehicle controller 23 distributes the target torques of the engine 11 and the motor 12 by the control logic, and transmits the target torques to each of the engine controller 21 and the motor controller 22. The engine controller 21 and the motor controller 22 drive the engine 11 and the motor 12 with the target engine torque and the target motor torque, respectively.

In determining an SOC modeling (S320), the vehicle controller 23 determines a state of charge (SOC) value of the high voltage battery 31 according to the operation of the motor 12 by a predetermined model. When the motor 12 is operated by the control logic with the target motor torque, the change in the SOC value of the high voltage battery 31 and the like is stored inside the vehicle controller 23 in the modeled state. When the vehicle is normal, the power is generated in each of the engine 11 and the motor 12 according to a pre-stored modeling to exert the driver demand torque, and the SOC value of the high voltage battery 31 is changed according to the operation of the motor 12. If there is abnormality in the engine 11 or the motor 12, failure is determined using the difference between the actual SOC value of the high voltage battery 31 and the determined SOC using the modeling.

After the determining of the SOC modeling (S320), comparing SOCs (S330), comparing times (S340), determining failure (S350), controlling a limp-home (S360), and alarming failure (S370) are performed.

The comparing of the SOCs (S330) to the alarming of the failure (S370) are the same as the comparing of the SOCs (S220), the comparing of the times (S230), the determining of the failure (S240), the controlling of the limp-home (S250), and the alarming of the failure (S260) in the aforementioned exemplary embodiment of the present invention.

Furthermore, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for sensing failure of a vehicle including an engine, a motor, a voltage battery for supplying power to the motor, and charged by a regenerative braking of the motor, an engine controller configured for controlling an operation of the engine, a motor controller configured for controlling an operation of the motor, and a vehicle controller configured for controlling the engine controller and the motor controller by distributing a target torque of a vehicle determined from a demand torque input by a driver to a target engine torque of the engine and a target motor torque of the motor, the method including:
    operating, by the vehicle controller, the engine and the motor by distributing the target torque to the target engine torque of the engine and the target motor torque of the motor according to a predetermined control logic according to the demand torque input by the driver;
    determining, by the vehicle controller, whether an actual engine torque of the engine is smaller than the target engine torque, or an actual motor torque of the motor is smaller than the target motor torque;
    determining, by the vehicle controller, whether a time period during which a state where the actual engine torque of the engine is smaller than the target engine torque, or the actual motor torque of the motor is smaller than the target motor torque is maintained is equal to or greater than a predetermined reference time period;
    concluding, by the vehicle controller, that one of the engine and the motor is failed, upon determining that the time period during which the state where the actual engine torque of the engine is smaller than the target engine torque, or the actual motor torque of the motor is smaller than the target motor torque is maintained is equal to or greater than the predetermined reference time period; and
    controlling a limp-home in which the target engine torque of the engine, the target motor torque of the motor, and a regenerative braking amount of the motor are limited by the vehicle controller,
    wherein in the controlling of the limp-home, the vehicle controller is configured to reduce the target engine torque, the target motor torque, and the regenerative braking amount of the motor as a traveling distance of the vehicle increases.

2. The method of claim 1,
    wherein upon determining that the actual engine torque of the engine is smaller than the target engine torque,
    in the controlling of the limp-home, the vehicle controller is configured to limit the target engine torque of the engine to a limit engine torque of the engine, and is configured to limit the target motor torque of the motor to a maximum motor torque upon the limp-home, to prevent the voltage battery from being over-discharged.

3. The method of claim 1,
    wherein upon determining that the actual motor torque of the motor is smaller than the target motor torque,
    in the controlling of the limp-home, the vehicle controller is configured to limit the regenerative braking amount of the motor to a value of being equal to or smaller than a maximum regenerative braking amount upon a predetermined limp-home, to prevent the voltage battery from being over-charged.

4. The method of claim 1, further including: after the concluding of the failure, operating, by the vehicle controller, a warning unit provided on a side of the vehicle.

5. The method of claim 1, wherein the vehicle controller includes:
    a processor; and
    a non-transitory storage medium on which a program for performing the method of claim 1 is recorded and executed by the processor.

6. A method for sensing failure of a vehicle including an engine, a motor, a voltage battery for supplying power to the motor, and charged by a regenerative braking of the motor, an engine controller configured for controlling an operation of the engine, a motor controller configured for controlling an operation of the motor, and a vehicle controller configured for controlling the engine controller and the motor controller by distributing a target torque of a vehicle determined from a demand torque input by a driver to a target engine torque of the engine and a target motor torque of the motor, the method including:
- determining, by the vehicle controller, a state of charge (SOC) value of the voltage battery according to the operation and the regenerative braking of the motor by a predetermined model;
- comparing, by the vehicle controller, whether a difference between the determined SOC value of the voltage battery and an actual SOC value of the voltage battery is greater than a predetermined reference value;
- determining, by the vehicle controller, whether a time period during which a state where the difference between the determined SOC and the actual SOC is greater than the predetermined reference value is maintained is equal to or greater than a predetermined reference time period;
- concluding, by the vehicle controller, that one of the engine and the motor is failed, upon determining that the time period during which the state where the difference between the determined SOC and the actual SOC is greater than the predetermined reference value is maintained is equal to or greater than the predetermined reference time period; and
- controlling a limp-home in which a use amount or a regenerative braking amount of the motor is limited by the vehicle controller,
- wherein in the controlling of the limp-home, the vehicle controller is configured to reduce a maximum motor torque upon the limp-home or a maximum regenerative braking amount upon the limp-home as a traveling distance of the vehicle increases.

7. The method of claim 6,
- wherein upon determining that the actual SOC is smaller than the determined SOC,
- in the controlling of the limp-home, the vehicle controller is configured to limit a torque of the motor to a value being equal to or smaller than a maximum motor torque upon a predetermined limp-home.

8. The method of claim 6, wherein upon determining that the actual SOC is greater than the determined SOC,
- in the controlling of the limp-home, the vehicle controller is configured to limit the regenerative braking amount of the motor to a value of being equal to or smaller than a maximum regenerative braking amount upon a predetermined limp-home.

9. The method of claim 6, further including: after the concluding of the failure, operating, by the vehicle controller, a warning unit provided on a side of the vehicle.

10. The method of claim 6, wherein in the comparing, the vehicle controller is configured to compare whether an absolute value of the difference between the determined SOC value of the voltage battery and the actual SOC value of the voltage battery is greater than the predetermined reference value.

11. The method of claim 6, wherein the vehicle controller includes:
- a processor; and
- a non-transitory storage medium on which a program for performing the method of claim 6 is recorded and executed by the processor.

12. A method for sensing failure of a vehicle including an engine, a motor, a voltage battery for supplying power to the motor, and charged by a regenerative braking of the motor, an engine controller configured for controlling an operation of the engine, a motor controller configured for controlling an operation of the motor, and a vehicle controller configured for controlling the engine controller and the motor controller by distributing a target torque of a vehicle determined from a demand torque input by a driver to a target engine torque of the engine and a target motor torque of the motor, the method including:
- operating, by the vehicle controller, the engine and the motor by distributing the target torque to the target engine torque of the engine and the target motor torque of the motor according to a predetermined control logic according to the demand torque input by the driver;
- determining, by the vehicle controller, a state of charge (SOC) value of the voltage battery as the motor operates with the target motor torque by a predetermined model;
- comparing, by the vehicle controller, whether a difference between the determined SOC value of the voltage battery and an actual SOC value of the voltage battery is greater than a predetermined reference value;
- determining, by the vehicle controller, whether a time period during which a state where the difference between the determined SOC and the actual SOC is maintained is greater than a predetermined reference time period;
- concluding, by the vehicle controller, that one of the engine and the motor is failed, upon determining that the time period during which the state where the difference between the determined SOC and the actual SOC is maintained is greater than the predetermined reference time period; and
- controlling a limp-home in which a use amount or a regenerative braking amount of the motor is limited by the vehicle controller,
- wherein in the controlling of the limp-home, the vehicle controller is configured to reduce a maximum motor torque upon the limp-home or a maximum regenerative braking amount upon the limp-home as a traveling distance of the vehicle increases.

13. The method of claim 12,
- wherein upon determining that the actual SOC is smaller than the determined SOC,
- in the controlling of the limp-home, the vehicle controller is configured to limit a torque of the motor to a value being equal to or smaller than a maximum motor torque upon a predetermined limp-home.

14. The method of claim 12, wherein upon determining that the actual SOC is greater than the determined SOC,
- in the controlling of the limp-home, the vehicle controller is configured to limit the regenerative braking amount of the motor to a value of being equal to or smaller than a maximum regenerative braking amount upon a predetermined limp-home.

15. The method of claim 12, further including: after the concluding of the failure, operating, by the vehicle controller, a warning unit provided on a side of the vehicle.

16. The method of claim 12,
- wherein in the comparing, the vehicle controller is configured to compare whether an absolute value of the difference between the determined SOC value of the voltage battery and the actual SOC value of the voltage battery is greater than the predetermined reference value.

17. The method of claim 12, wherein the vehicle controller includes:
   a processor; and
   a non-transitory storage medium on which a program for performing the method of claim 12 is recorded and executed by the processor.

\* \* \* \* \*